United States Patent

Wagner et al.

[11] Patent Number: 6,100,796
[45] Date of Patent: Aug. 8, 2000

[54] OBSTACLE RECOGNITION SYSTEM IN A MOTOR VEHICLE

[75] Inventors: Armin Wagner, Karlsfeld; Walter Horst, Munich, both of Germany

[73] Assignee: Bayerische Motoren Werke Aktiengesellschaft, Munich, Germany

[21] Appl. No.: 09/248,289

[22] Filed: Feb. 11, 1999

[30] Foreign Application Priority Data

Feb. 11, 1998 [DE] Germany ............... 198 05 515

[51] Int. Cl.⁷ .................................. B60Q 1/00
[52] U.S. Cl. ................... 340/435; 340/436; 340/903; 701/301
[58] Field of Search .................. 340/435, 436, 340/903, 904; 701/301

[56] References Cited

U.S. PATENT DOCUMENTS 5,235,315  8/1993  Cherry et al. ............... 340/435

FOREIGN PATENT DOCUMENTS 34 20 004  12/1985  Germany .
43 03 815   8/1994  Germany .
43 08 373   9/1994  Germany .

*Primary Examiner*—Daryl Pope
*Attorney, Agent, or Firm*—Evenson, McKeown, Edwards & Lenahan, PLLC

[57] ABSTRACT

In an obstacle recognition system in a motor vehicle with an electronic control device and with sensors to detect the distance of an obstacle in a predetermined area, the control device, in a defined partial area of a part, possibly mounted on the vehicle, that could be detected by a sensor as an obstacle, in the event of an actual obstacle being recognized in this partial area, in a first step determines the distance of the obstacle. In a second step, the control device checks to see whether this distance is changing. The alarm that is usually triggered as a function of the distance of the obstacle is suppressed if the distance of the obstacle detected in the defined partial area does not change.

9 Claims, 1 Drawing Sheet

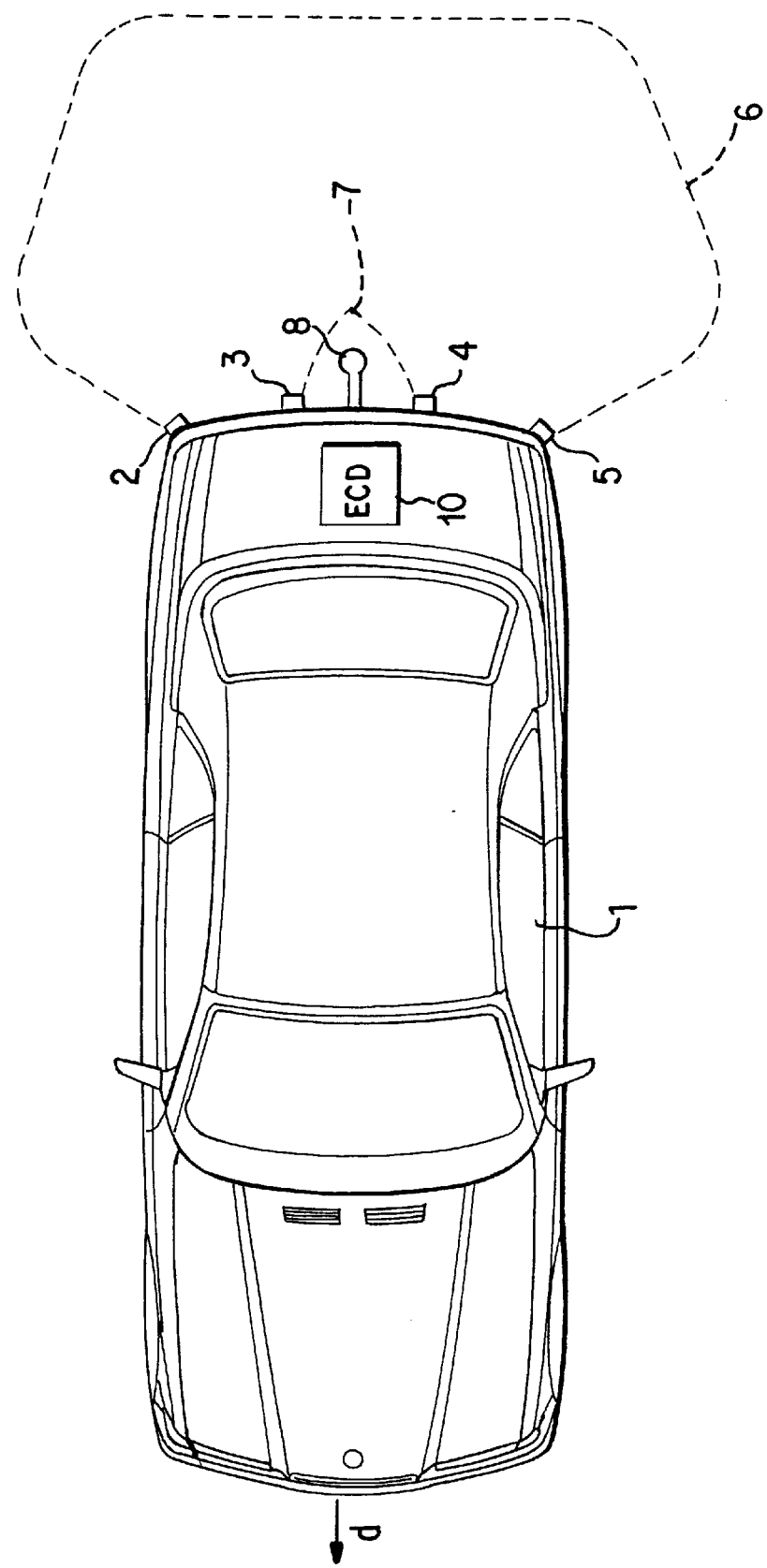

OBSTACLE RECOGNITION SYSTEM IN A MOTOR VEHICLE

BACKGROUND AND SUMMARY OF THE INVENTION

This application claims the priority of German Patent Application No. 198 05 515.3, filed Feb. 11, 1998, the disclosure of which is expressly incorporated by reference herein.

The invention relates to an obstacle recognition system in a motor vehicle and, more particularly, to an obstacle recognition system in a motor vehicle with an electronic control device and sensors for detecting the distance of an obstacle within a predetermined area.

An obstacle recognition system of this kind is known for example by the term "Park Distance Control" (PDC) for BMW vehicles (cf. brochure entitled "The BMW 5 Touring," Accessories, 1995, Page 10, Point 2). This known PDC obstacle recognition system has an electronic control device and sensors to detect the distance from an obstacle within a specified area. Sensors of this kind can be provided, for example, in the rear area as well as in the front area to facilitate parking. In the known PDC obstacle recognition system, four sensors in the form of ultrasonic sensors are integrated at least into the rear bumper, which can be activated automatically for example when the reverse gear is engaged. By means of warning pulses with a changing interval, the current distance to an obstacle behind the vehicle is signaled. The specified area within which the obstacle recognition system operates is defined in particular by the lobe-shaped acquisition areas of the sensors.

Problems are created in a PDC obstacle recognition system activated in this way by various parts mounted on the vehicle, which may be located in the acquisition area of the sensors, and therefore basically could be detected as obstacles. One such part is a trailer hitch for example. If the trailer hitch is supporting a trailer which is also connected electrically with the vehicle, a signal to suppress the activated obstacle recognition system can be delivered by this electrical connection.

The goal of the invention is to suppress a false alarm from an obstacle recognition system when parts are mounted on the vehicle, especially a trailer hitch, even when the trailer is not connected.

This goal is achieved by providing an obstacle recognition system in a motor vehicle with an electronic control device and with sensors for detecting the distance of an obstacle within a predetermined area. The control device, in a defined partial area of a part possibly mounted on the vehicle which could be recognized by a sensor as an obstacle, in the event of recognition of an actual obstacle in this partial area, in a first step determines the distance of the obstacle and in a second step checks to determine whether this distance is changing.

In a preferred embodiment, the alarm that is usually triggered as a function of the distance to the obstacle is suppressed if the distance to the obstacle detected in the defined partial area does not change.

It is essential to the present invention that the control device, in a specified partial area in which a part might possibly be connected to the vehicle that could be detected as an obstacle by a sensor, in the event of an actual obstacle being detected in this partial area, determine in a first step the distance of the obstacle from the vehicle itself. In a second step, the control device checks whether the distance changes, for example during a movement of the vehicle or after a predetermined time. The invention is based on the fact that when parts (mounted on the vehicle) are detected as obstacles, the distance does not change during a movement of the vehicle. However, during a movement of the vehicle or the obstacle, the distance from obstacles located outside the vehicle does change. As a result of the ability to distinguish between obstacles that are detected, an alarm from the obstacle recognition system can be suppressed for example when the detected "obstacle" turns out to be a part.

Other objects, advantages and novel features of the present invention will become apparent from the following detailed description of the invention when considered in conjunction with the accompanying drawings.

BRIEF DESCRIPTION OF THE DRAWING

The sole FIGURE represents one embodiment of the present invention, in which a vehicle with an obstacle recognition system according to the invention has a trailer hitch mounted as a part.

DETAILED DESCRIPTION OF THE DRAWING

A vehicle 1 has, at least on its rear bumper 4, ultrasonic sensors 2 to 5 by which all obstacles can be detected in an area 6 defined by the lobe-shaped acquisition areas of ultrasonic sensors 2 to 5. The operation of the sensors to detect obstacles is well known and will therefore not be discussed here in detail.

In the example shown, vehicle 1 has a trailer hitch 8 as a part. This trailer hitch 8 is located in the acquisition area of the ultrasonic sensors 3 and 4.

In the electronic control device 10 for the obstacle recognition system of the motor vehicle 1 (shown only generally as within the vehicle), a defined partial area 7 is stored in which trailer hitch 8 is located and can be detected. If the control device 10 recognizes that there is an obstacle in defined partial area 7, a movement of the motor vehicle, forward or backward for example, is awaited. After the movement is detected, the system checks to determine whether the distance from the obstacle previously recognized in the defined partial area 7 has changed. For example, if the vehicle 1 moved a distance "d" forward, then the distance to the obstacle would have to increase by this distance d if the obstacle recognized in the defined partial area 7 were located outside the motor vehicle. If this distance does not change, however, the obstacle recognition system concludes that a trailer hitch 8 (or other fixed part) is present. In this case, the alarm that would be otherwise triggered if an obstacle outside the vehicle were present is suppressed.

Preferably, the above steps according to the invention are performed only when the information stored in the control device, by encoding or by data bus information for example, indicates that the vehicle has a trailer hitch. However, if no such information is present, the steps according to the invention are always performed. It is readily understood that the steps performed by the control device can be implemented via software, hardware, or some combination of both.

In addition, it should be pointed out that in this embodiment, when there is a trailer hitch 8, starting with the vehicle at rest, a distinction can be made as to whether the vehicle is moving forward or backward. If the vehicle moves forward starting from rest, no alarm is triggered from the outset by the obstacle recognition system according to the invention. However, if the vehicle moves backward, an alarm is preferably triggered, for the sake of safety, after an obstacle is detected in the defined partial area 7, until it is determined from the backward movement of the motor vehicle that the distance is not changing and hence a trailer hitch 8 has been installed. Only then is the alarm suppressed.

As a precaution, it should also be pointed out that any type of sensors, such as ultrasonic, radar, or laser sensors, can be used and that the alarm can be emitted both acoustically and optically or haptically. It is important to check the change in distance when the vehicle moves following detection of an obstacle. Of course, the alarm from the obstacle recognition system is not suppressed when a plurality of obstacles is detected and the distance changes, in particular decreases, relative to only one obstacle, especially in the defined partial area.

This obstacle recognition system according to the invention allows a previously impossible connection of a PDC system to a trailer hitch.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An obstacle recognition system in a motor vehicle, comprising:
    at least one sensor for detecting a distance to an obstacle within a predetermined area;
    an electronic control device coupled to the at least one sensor, said control device including means for determining in a first step the distance to an obstacle within a defined partial area within the predetermined area for a component which may be mounted on the vehicle and could be recognized by the at least one sensor as the obstacle, and
    means for checking in a second step whether the distance to the obstacle is changing, thereby determining that the obstacle is mounted on the vehicle if the distance to the obstacle does not change.

2. The obstacle recognition system according to claim 1, further comprising an alarm coupled to the electronic control device, an alarm signal of the alarm which is usually triggered as a function of the distance to the obstacle being suppressed if the distance to the obstacle detected in the defined partial area does not change.

3. A method of operating an obstacle recognition system in a motor vehicle, the system including a sensor system operable to detect distances to obstacles within a predetermined area, the method comprising the acts of:
    determining whether an obstacle is in a defined partial area within the predetermined area, in which components that are possibly mounted on the vehicle may be arranged;
    if such an obstacle is recognized, then firstly determining a distance to the obstacle and secondly determining whether the distance varies; and
    determining that the obstacle is mounted on the vehicle if the distance to the obstacle does not vary.

4. The method according to claim 3, further comprising the act of suppressing an alarm signal if the distance to the obstacle detected in the defined partial area does not vary.

5. A method of operating an obstacle recognition system in a motor vehicle, the system including a sensor system operable to detect distances to obstacles within a predetermined area, the method comprising the acts of:
    recognizing an obstacle within a defined partial area within the predetermined area, in which parts that are possibly mounted on the vehicle may be arranged;
    determining a distance to the obstacle;
    determining whether the distance to the obstacle is changing; and
    determining that the obstacle is mounted on the vehicle if the distance to the obstacle does not change.

6. The method according to claim 5, wherein the act of determining whether the distance to the obstacle is changing is performed by determining the distance to the obstacle at successive points in time and comparing the detected distances.

7. A software product for operating an obstacle recognition system which includes a sensor system operable to detect distances to obstacles within a predetermined area, comprising:
    a computer readable medium having stored thereon a program code segment that:
        recognizes an obstacle within a defined partial area within the predetermined area, in which parts that are possibly mounted on the vehicle may be arranged;
        determines a distance to the obstacle;
        determines whether the distance to the obstacle is changing; and
        determines that the obstacle is mounted on the vehicle if the distance to the obstacle does not change.

8. The software product according to claim 7, further wherein the computer readable medium has stored thereon a program code segment that suppresses an alarm signal if the distance to the obstacle detected in the defined partial area does not vary.

9. The method according to claim 5, further comprising the act of:
    suppressing an alarm signal, normally triggered as a function of the distance to the obstacle, if the distance to the obstacle detected in the defined partial area does not change.

* * * * *